United States Patent [19]
Eda et al.

[11] Patent Number: 5,408,566
[45] Date of Patent: Apr. 18, 1995

[54] OPTICAL GUIDED-WAVE DEVICE AND MANUFACTURING METHOD

[75] Inventors: Kazuo Eda, Nara; Miho Sugihara, Higashi osaka, both of Japan

[73] Assignee: Matsushita Electric Industrial Co., Ltd., Osaka, Japan

[21] Appl. No.: 49,308

[22] Filed: Apr. 21, 1993

[30] Foreign Application Priority Data

Apr. 21, 1992 [JP] Japan .................................. 4-100837
Apr. 27, 1992 [JP] Japan .................................. 4-107134
May 26, 1992 [JP] Japan .................................. 4-133248

[51] Int. Cl.$^6$ ................................................. G02B 6/10
[52] U.S. Cl. ....................................... 385/131; 385/130; 385/129; 385/8
[58] Field of Search ............... 385/129, 130, 131, 132, 385/1-16

[56] References Cited

U.S. PATENT DOCUMENTS 4,679,892  7/1987  Haisma et al. ..................... 385/130
4,728,167  3/1988  Soref et al. ..................... 385/130 X

FOREIGN PATENT DOCUMENTS 2284130  4/1976  France .

*Primary Examiner*—Rodney B. Bovernick
*Assistant Examiner*—Phan Thi Heartney
*Attorney, Agent, or Firm*—Willian Brinks Hofer Gilson & Lione

[57] ABSTRACT

An optical guided-wave device with an electro optic effect is comprised of first and second substrates having first and second refractive indices wherein the second refractive index is larger than the first one. These substrates are made of a single crystal dielectric material such as lithium tantalate or lithium niobate and, if they are made of the same material, they have different crystal orientations resulting in different refractive indices. These substrates are physically bonded directly or via a thin film such as glass, silicon, silicon oxide or silicon nitride and then, the second substrate is thinned and worked to form a wave guide therein.

43 Claims, 7 Drawing Sheets

OPTICAL GUIDED-WAVE DEVICE AND MANUFACTURING METHOD

BACKGROUND OF THE INVENTION

1. Field of the Invention

The present invention relates to a structure for improving the performance of various optical guided-wave devices using an optical wave guide for such applications as optical power modulation, optical switching, plane of polarization control, optical phase matching and propagation mode control, and further relates to the manufacturing method of said structure.

2. Description of the Prior Art

Conventional optical guided-wave devices such as optical modulators, optical switches, plane of polarization control devices, optical phase matching and optical propagation mode control devices form a single propagation mode optical wave guide in a dielectric single crystal having an electro-optic effect (such as lithium niobate ($LiNbO_3$) or lithium tantalate ($LiTaO_3$)), and control the passage of light through the optical wave guide by manipulating the shape of the optical wave guide, providing appropriately shaped electrodes, and utilizing the electrooptic effect. The structure of such optical guided-wave devices is described in *Waveguide Electrooptic Modulators* by R. Alferness, (IEEE Transactions on Microwave and Techniques, Vol. MTT-30, No. 8, 1121–1137 (August, 1989)). Manufacturing methods for optical wave guides are likewise described in *Optical Waveguide Modulators* by I. Kaminow (IEEE Transactions on Microwave and Techniques, Vol. MTT-23, No. 1, 57–70 (1975)).

In one such manufacturing method, lithium niobate or lithium tantalate is heat treated at a high temperature to modify the refractive index of the material by out-diffusing the lithium. Alternatively, a metallic film of, for example, titanium is formed by vapor deposition and thermally diffused at a high temperature to raise the refractive index of the diffused area slightly above that of the surrounding area. In either case, the difference in refractive indexes is used to trap light.

An example of a Mach-Zehnder type optical modulator using a titanium diffusion is described in Japanese patent laid-open publication SHO 63-261219. In another method described in the literature, a metallic mask is formed over the specified areas and a proton-ion exchange is induced in phosphoric acid at 200° C. to 300° C., partially modifying the refractive index and forming the optical wave guide. Manufacturing methods that rely on out-diffusion, thermal diffusion, or ion exchange from the surface all form the optical wave guide by means of diffusion from the surface. The cross section of the optical wave guide is therefore necessarily determined by the diffusion process, resulting in numerous problems.

One of the biggest problems is coupling loss between the optical wave guide and the optical fiber. While the cross section of an optical fiber is circular, the shape of most conventional optical wave guides is roughly an inverted triangle due to formation of the optical wave guide by diffusion from the surface. Because the strength of the guided light is greatest near the surface, optical coupling with the optical fiber is poor, resulting in significant loss. Reducing this optical coupling loss is therefore an extremely important topic in optical guided-wave device design.

Another problem caused by diffusion processing is greater optical propagation loss after diffusion processing than before. With a titanium diffusion optical wave guide, for example, propagation loss of approximately 1 dB/cm normally occurs. Reducing propagation loss is therefore another major topic in optical guided-wave device design.

A third problem is the increase in optical damage resulting from diffusion processing. Optical damage refers to the increase in propagation loss over time when a high intensity light source or a short wavelength light source is input to a diffusion-type optical wave guide. This is believed to be caused by the diffusion of ions in the optical wave guide resulting in increased trapping of electrons in the optical wave guide.

It should be noted that methods for forming an optical wave guide without relying on diffusion processing have been described. One of these is described by Kaminow (see above reference). In this method, lithium niobate crystals are grown on top of a lithium tantalate layer, or a lithium niobate thin-film is formed by sputtering on top of a lithium niobate or lithium tantalate layer, and the optical wave guide is formed in this lithium niobate top layer. A similar method is described in Japanese patent laid-open publication SHO 52-23355. This method also forms an epitaxial growth lithium niobate top layer over a substrate of lithium tantalate (e.g.) using liquid phase, gas phase, fusion, or other method, and forms the optical wave guide in this top layer. There are, however, several problems with these optical wave guide formation methods using such thin-film crystal growth technologies. First, it is extremely difficult to achieve a thickness of greater than 5 $\mu$m in epitaxial growth films, and productivity is accordingly poor, because of the growth speed and flaws occurring in the crystals while being grown. In addition, the coupling characteristics of a thin-film less than 5 $\mu$m thick with an optical fiber having a core diameter of approximately 10 $\mu$m are also poor. (The fiber core being where the light is trapped.)

Productivity is further hampered because a good quality single crystal thin-film cannot be obtained unless the lattice constants of the thin film is essentially same as those of the substrate. It is therefore extremely difficult to form a good lithium niobate thin-film on a lithium tantalate substrate, and a mixed niobium-tantalum crystal film is often used. Pure lithium niobate, however, offers superior overall optical wave guide characteristics when compared with a mixed crystal film.

While epitaxial growth of like materials is possible, the crystal orientation of the two layers will be the same, making it difficult to obtain an effective difference between the refractive index of the base substrate and that of the grown thin-film. This results in a solid substrate in which the optical wave guide cannot be formed.

If the thin-film formed by these thin-film growth technologies is not good, propagation loss will increase and optical damage will increase even when the layers are stacked thickly, and the resulting film is therefore not desirable.

SUMMARY OF THE INVENTION

Therefore, an object of the present invention is to provide a manufacturing method and structure for an optical guided-wave device characterized by minimal optical fiber coupling loss, minimal propagation loss, and minimal optical damage.

To achieve this object, an optical guided-wave device according to the present invention has an electro-optic effect and comprises an optical wave guide formed in a wafer of at least two bonded single crystal dielectric body substrates. The refractive indexes of these substrates differ and are determined by the crystal orientation of the dielectric body when the substrates are of like materials, or are determined by the basic material composition when the substrates are of different materials. The substrates are directly bonded, or are bonded through a glass film, silicon film, silicon oxide film, or silicon nitride film formed at a predetermined place on the substrates. Guided light is trapped inside one of the single crystal dielectric substrates due to the difference in the refractive indexes of the substrates. The optical guided-wave device controls the light passing through the optical wave guide by means of the electro-optic effect of the device.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of an optical guided-wave device according to the present invention as applied to an optical modulator, and the manufacturing methods of such devices, are described below with reference to the accompanying figures.

First Embodiment

Figure 1:
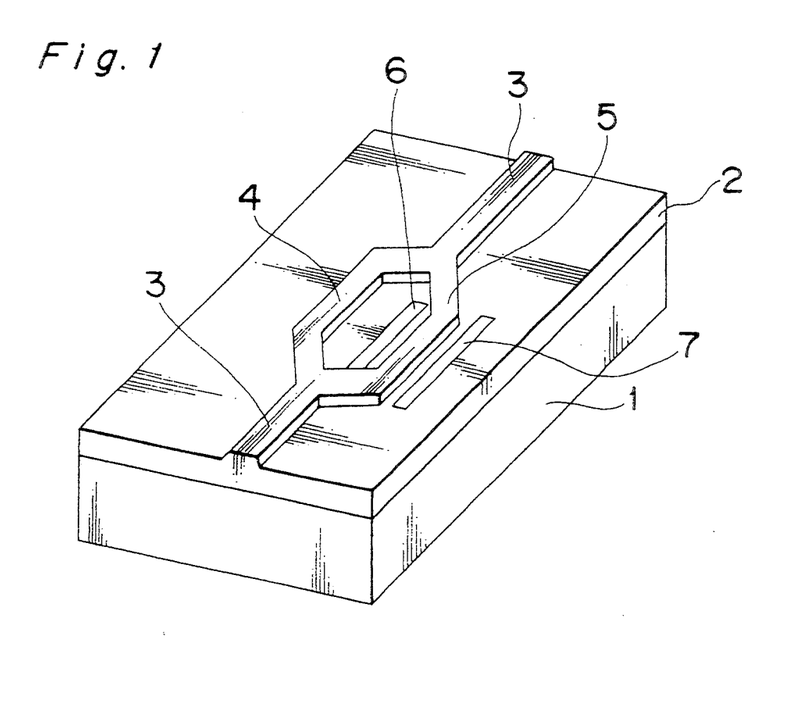
FIG. 1 is an oblique view of an optical guided-wave device according to the first embodiment of the invention.
Figure 2:
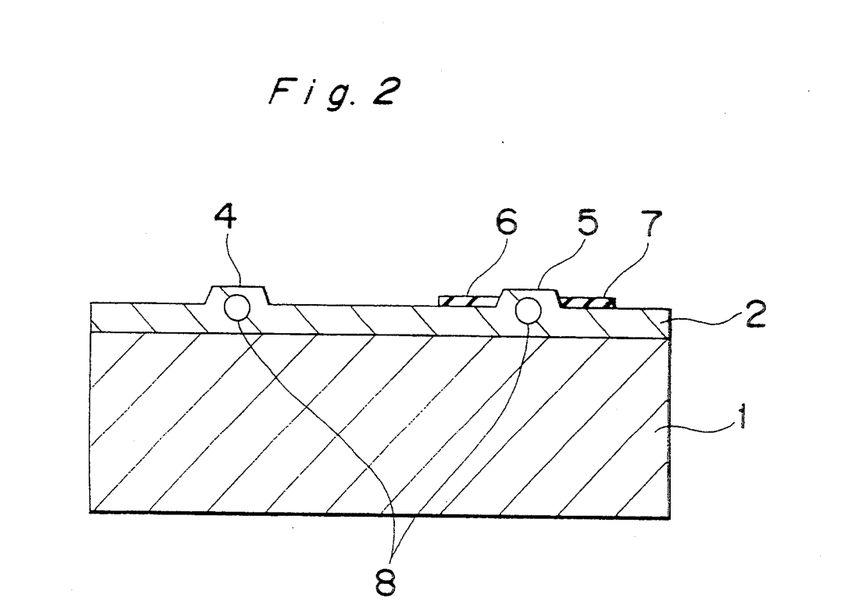
FIG. 2 is a cross section of an optical guided-wave device according to the first embodiment of the invention.

The structure of the first embodiment is shown in FIGS. 1 and 2. FIG. 1 is an oblique view of the optical guided-wave device as applied in an optical modulator comprising a lithium niobate substrate 1, a lithium niobate thin-plate 2 bonded onto the lithium niobate substrate 1, an input/output (I/O) optical wave guide 3 formed on the lithium niobate thin-plate 2, first and second optical wave guide branches 4 and 5, and electrodes 6, 7 formed on both sides of the second optical wave guide branch 5.

The lithium niobate thin-plate 2 is directly bonded to the lithium niobate substrate 1 by cleaning and hydrophilic processing of the surface of each substrate before direct heat bonding. The crystal orientation of the lithium niobate thin-plate 2 is different from that of the lithium niobate substrate 1.

The optical wave guide branches 4 and 5 are formed by splitting the input side of the optical wave guide 3.

FIG. 2 is a cross section of FIG. 1 at a section through the first and second optical wave guide branches 4 and 5. Like reference numerals indicate the same components in FIGS. 1 and 2. The optical wave guide branches 4 and 5 and the I/O optical wave guide 3 have a trapezoidal cross section characteristic of a so-called ridge-type optical wave guide. The guided light propagators 8 are located below the optical wave guide branches 4 and 5.

The construction of this optical modulator is known as a Mach-Zehnder design. Incident light entering the input branches into two parts. An electrical field is applied to one of the optical wave guide branches, creating an electro-optic effect that modifies the refractive index of the optical wave guide, changes the propagation speed of the guided light, and thus offsets the phase of the light when the branches rejoin. The effect of this is to modulate the strength of the light at the output.

The dielectric constant of lithium niobate parallel to the optical axis of the crystal is significantly different from the dielectric constant perpendicular to the optical axis, resulting in a corresponding difference in the refractive index in each direction. The refractive index to ordinary light is approximately 2.29 while the refractive index to extraordinary light is 2.20. If there is a difference of greater than approximately 0.01 in the refractive indexes, light can be trapped in the area with the higher refractive index, thus making it possible to form an optical wave guide.

In this embodiment the crystal axes of the lithium niobate substrate 1 and the lithium niobate thin-plate 2 are selected so that the refractive index of the lithium niobate thin-plate 2 is greater than that of the lithium niobate substrate 1 for the optical propagation mode. As a result, light incident to the lithium niobate thin-plate 2 is trapped inside the thin-plate. By additionally employing a ridge construction, the effective dielectric constant of the area under the ridges is greater than that of the other (thinner) areas, thus trapping light below the ridges and enabling the under-ridge area to act as an optical wave guide.

The shape of the optical wave guide in this case is either trapezoidal or rectangular in end cross section with a uniform refractive index, thus placing the center of the guided light near the center of the optical wave guide with an approximately circular cross section. The cross section of the I/O optical wave guide 3 is the same. This results in extremely good coupling efficiency between the round I/O optical wave guide structure and the core (approx. 10 μm diameter) of the optical fiber.

Typical values for these dimensions are a lithium niobate substrate 1 thickness of 600 μm, lithium niobate thin-plate 2 optical wave guide thickness of 7 μm, ridge height at the peak of 3 μm, optical wave guide width of 7 μm, optical wave guide branch length of 2 cm, and total optical wave guide length of 3 cm. The electrodes are aluminum.

With this construction, optical fiber coupling loss is less than 0.3 dB at one plane when coupled with adhesive bonding using an adhesive with an adjusted refractive index. This is a significant improvement over the typical coupling loss of 0.5–1.0 dB of an optical guided-wave device using a conventional titanium diffusion optical wave guide and the same adhesive bonding method. The performance of the optical modulator itself is equivalent to that of the conventional titanium diffusion optical wave guide.

Optical propagation loss of the optical wave guide is also significantly reduced because a lithium niobate thin-plate with the optical characteristics of pure single crystals is used without ion diffusion processing. Specifically, optical wave guide propagation loss of less than 0.1 dB/cm is easily obtained. This is also a significant improvement over the conventional titanium diffusion optical wave guide in which propagation loss ranges from 0.5–1.0 dB/cm.

The strength of the input light was also varied from 0 dBm to 30 dBm to determine the optical damage characteristic, but virtually no optical damage was observed. This is attributed to the use of a pure single crystal lithium niobate thin-plate with an extremely low level of trapped electrons as the optical wave guide.

Measurements were made using a 1.3 μm wavelength light.

Second Embodiment

Figure 3:
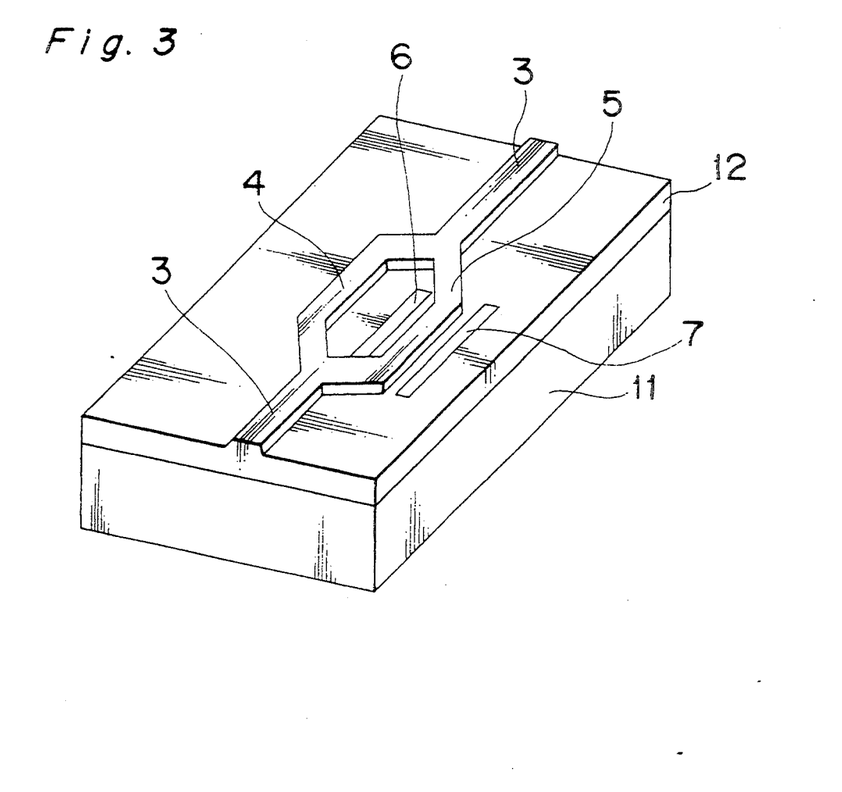
FIG. 3 is an oblique view of an optical guided-wave device according to the second embodiment of the invention.
Figure 4:
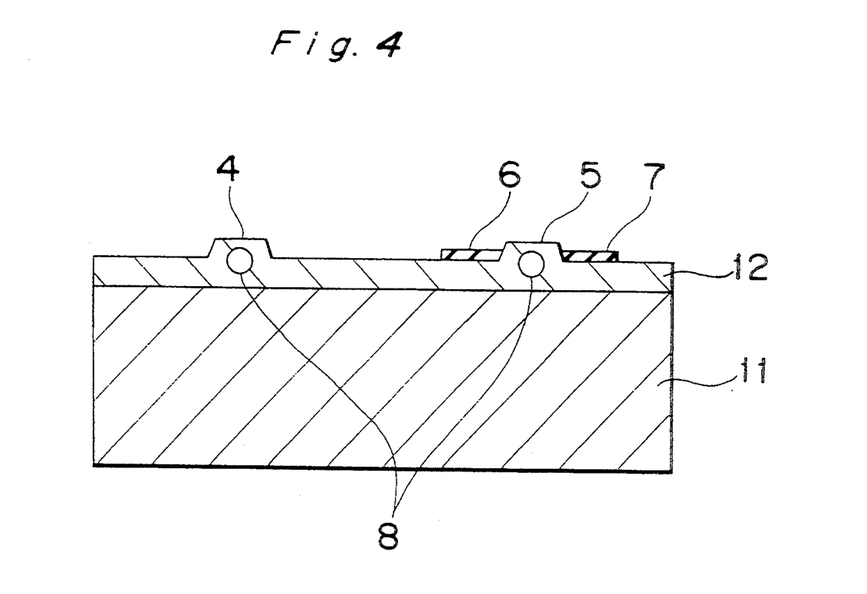
FIG. 4 is a cross section of an optical guided-wave device according to the second embodiment of the invention.

The structure of the second embodiment is shown in FIGS. 3 and 4. FIG. 3 is an oblique view of the optical guided-wave device as applied in an optical modulator, and FIG. 4 is a cross section of FIG. 3 at a section through the first and second optical wave guide branches 4 and 5. This embodiment differs from the first in that a lithium niobate thin-plate 12 is directly bonded to a lithium tantalate substrate 11 by cleaning and hydrophilic processing of the surface of both substrates before direct heat bonding. Identical parts in the first and second embodiments are identified by the same reference numerals.

The refractive indices of lithium tantalate and lithium niobate differ. The refractive index to ordinary light of lithium tantalate is 2.175 while that of lithium niobate is 2.29. This results in an appropriate difference of 0.115. Light can therefore be trapped in the lithium niobate layer with the higher refractive index, thus forming an optical wave guide. Light incident to the lithium niobate thin-plate 12 is therefore trapped inside the thin-plate. By additionally employing a ridge construction, the effective dielectric constant of the area under the ridges is greater than that of the other (thinner) areas, thus trapping light below the ridges and enabling the under-ridge area to act as an optical wave guide.

The shape of the optical wave guide in this embodiment is identical to that of the first embodiment, and coupling efficiency with the round optical wave guide structure of the optical fiber is extremely good.

Typical values for these dimensions are a lithium tantalate substrate 11 thickness of 600 μm with all other values the same as in the first embodiment above.

With this construction, optical fiber coupling loss is less than 0.3 dB as in the first embodiment, a significant improvement over the conventional model.

Optical wave guide propagation loss of less than 0.1 dB/cm is easily obtained, again as in the first embodiment. The results of optical damage observations were also the same as in the first embodiment above.

Third Embodiment

This third embodiment describes a first embodiment of a manufacturing method for an optical guided-wave device according to the invention.

First, the surfaces of two lithium niobate wafers with different crystal orientations and each mirror polished are cleaned with an etching process. Specifically, the surface layer of the lithium niobate wafer is etched away using a hydrofluoric acid etching agent. The surfaces are then flushed in demineralized water and immediately sandwiched uniformly together, easily enabling direct bonding by the water, hydroxyl groups, and hydrogen adsorbed in the lithium niobate wafer surfaces. While this process yields a sufficiently strong bond, the bond is further strengthened by heat treatment at a temperature between 100° C. and 1100° C.

The lithium niobate wafer with the crystal orientation having the higher refractive index is then mechanically polished and etched to a thin-plate layer. After reducing the wafer to a thickness of 7 μm, an etching mask is formed on the thinned lithium niobate wafer to the pattern of the optical wave guide structure shown in the first embodiment using photolithography techniques, and the unmasked areas (the area not forming the optical wave guide) are removed to a depth of 3 μm by etching. The mask is Cr and the etching agent is a hydrofluoric acid etching solution. The mask is then removed, and the aluminum electrodes are formed using conventional photolithography and etching technologies.

This process yields the structure of the optical guided-wave device as shown in the first embodiment. The coupling characteristic, propagation loss, and optical damage characteristic of this optical guided-wave device and optical fiber are as described above with reference to the first embodiment.

Fourth Embodiment

This fourth embodiment describes a second embodiment of a manufacturing method for an optical guided-wave device according to the invention.

As in the third embodiment above, the surfaces of a lithium niobate wafer and a lithium tantalate wafer, which are ground to a mirror finish, are cleaned with an etching process. The subsequent process is the same as in the third embodiment above, resulting in direct bonding of the lithium tantalate and lithium niobate wafers. After reducing the thickness of the lithium niobate wafer, which has a higher refractive index, to 7 μm, the wafer is masked, etched, and aluminum electrodes are formed as described in the third embodiment, resulting in an optical guided-wave device constructed as described in the second embodiment above.

The coupling characteristic, propagation loss, and optical damage characteristic of this optical guided-wave device coupled to the optical fiber are as described above with reference to the second embodiment.

In both the third and fourth embodiments, the heat treatment effect strengthening the bond results in a several fold increase in bond strength by simply baking the wafers for approximately one hour at 100° C. This process yields a bond strength of several 10 kg/cm². In general, bond strength increases with an increase in process temperature or time. When the temperature exceeds 1100° C., however, lithium is rapidly released from the surface of both lithium niobate and lithium tantalate wafers, significantly deteriorating the wafer surface characteristics and optical guided-wave device performance. The bonding heat treatment temperature is therefore preferably less than 1100° C.

Because the thermal expansion coefficients are equivalent when two lithium niobate wafers are bonded as described in the third embodiment, the heat treatment temperature needed to improve bond strength is both higher and easier to regulate. In this case wafer separation does not occur even when a high mechanical polishing force is used to thin the wafer, and the optical guided-wave device itself can operate stably at a higher temperature. As a result, when the optical guided-wave device is manufactured by bonding wafers of like materials, a device with a high direct bond strength and stable operation at high temperatures can be obtained.

This direct bonding is attributed to the ion bonding strength of the water, hydroxyl groups, and hydrogen adsorbed by the surface of the dielectric wafers from the water. Application of heat in this state causes the water to escape from the bonding interface and both directly adsorbed hydrogen and hydrogen in the hydroxyl groups to escape. The residual oxygen and oxygen in the surface of the dielectric (which is an oxide) to react with the other constituent elements of the dielectric, thereby increasing the bond strength.

Fifth Embodiment

Figure 5:
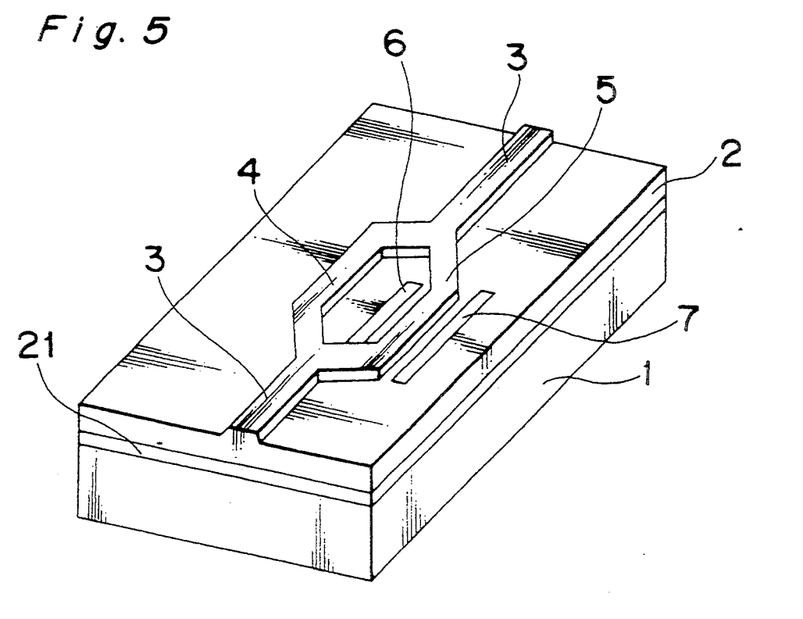
FIG. 5 is an oblique view of an optical guided-wave device according to the third embodiment of the invention.
Figure 6:
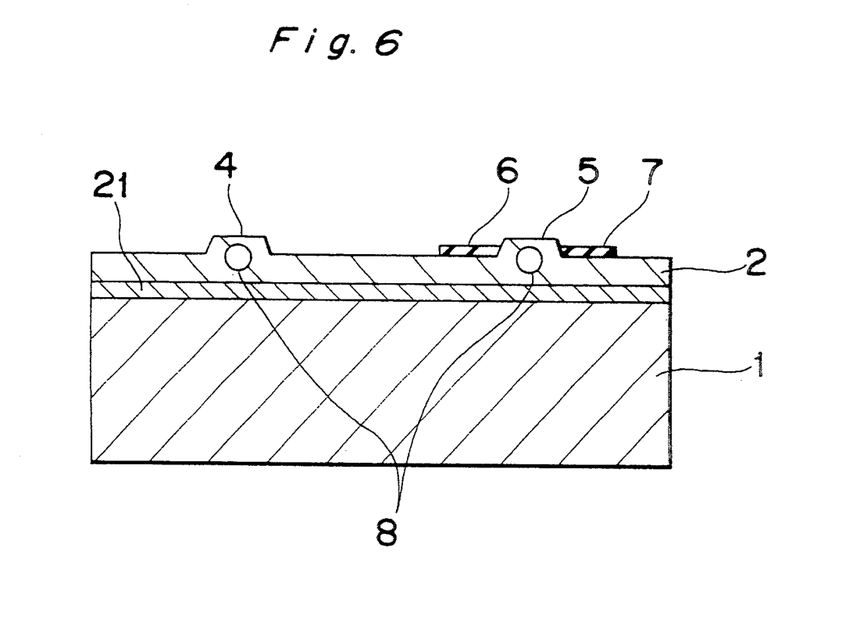
FIG. 6 is a cross section of an optical guided-wave device according to the third embodiment of the invention.

This fifth embodiment describes a third embodiment of an optical guided-wave device structure according to the present invention is described below with reference to FIGS. 5 and 6. As in the first embodiment above, FIG. 5 is an oblique view of the optical guided-wave device as applied in an optical modulator, and FIG. 6 is a cross section of FIG. 5 at a section through the first and second optical wave guide branches 4 and 5. Identical parts in the first and third embodiments are identified by the same reference numerals 1–8.

This embodiment differs from the first in that a glass film 21 bonds the lithium niobate substrate 1 to the lithium niobate thin-plate 2.

The optical wave guide branches 4 and 5 and the I/O optical wave guide 3 have a trapezoidal cross section characteristic of a so-called ridge-type optical wave guide. The guided light propagators 8 are located below the optical wave guide branches 4 and 5. The structure and function of the optical modulator are basically the same as described in the first embodiment.

As also described in the first embodiment, the dielectric constant of lithium niobate parallel to the optical axis of the crystal is significantly different from the dielectric constant perpendicular to the optical axis, resulting in a corresponding difference in the refractive index in each direction. In this embodiment the crystal axes of the lithium niobate substrate 1 and the lithium niobate thin-plate 2 are selected so that the refractive index of the lithium niobate thin-plate 2 is greater than that of the lithium niobate substrate 1 for the optical propagation mode. Although the refractive index of the bonding glass film 21 between the wafers is approximately 1.5 and less than that of lithium niobate, light incident to the lithium niobate thin-plate 2 is trapped inside the thin-plate because the glass film 21 thickness is 0.5 μm, significantly thinner than the optical wave guide blocking thickness. By additionally employing a ridge construction in the lithium niobate thin-plate 2, the effective dielectric constant of the area under the ridges is greater than that of the other (thinner) areas, thus trapping light below the ridges and enabling the under-ridge area to act as an optical wave guide.

As in the first embodiment, the shape of the optical wave guide in this case is either trapezoidal or rectangular in end cross section with a uniform refractive index, thus placing the center of the guided light near the center of the optical wave guide with an approximately circular cross section. The cross section of the I/O optical wave guide 3 is also the same. This results in extremely good coupling efficiency between the round I/O optical wave guide structure and the core (approx. 10 μm diameter) of the optical fiber.

Typical values for these dimensions are a lithium niobate substrate 1 thickness of 600 μm, lithium niobate thin-plate 2 thickness of 7 μm, peak ridge height of 3 μm, optical wave guide width of 7 μm, glass film thickness of 0.5 μm, optical wave guide branch length of 2 cm, and total optical wave guide length of 3 cm. The electrodes are aluminum.

With this construction, optical fiber coupling loss is less than 0.3 dB at one plane when coupled with adhesive bonding using an adhesive with an adjusted refractive index, a significant improvement over the coupling loss in conventional devices. The performance of the optical modulator itself is equivalent to that of the conventional titanium diffusion optical wave guide.

Optical propagation loss of the optical wave guide is also significantly reduced because a lithium niobate thin-plate with the optical characteristics of pure single crystals is used without ion diffusion processing. Specifically, optical wave guide propagation loss of less than 0.1 dB/cm is easily obtained. This is also a significant improvement over the conventional titanium diffusion optical wave guide in which propagation loss ranges from 0.5–1.0 dB/cm.

The strength of the input light was also varied from 0 dBm to 30 dBm to determine the optical damage characteristic, but virtually no optical damage was observed. This is attributed to the use of a pure single crystal lithium niobate thin-plate with an extremely low level of trapped electrons as the optical wave guide.

Measurements were made using a 1.3 μm wavelength light.

Sixth Embodiment

Figure 7:
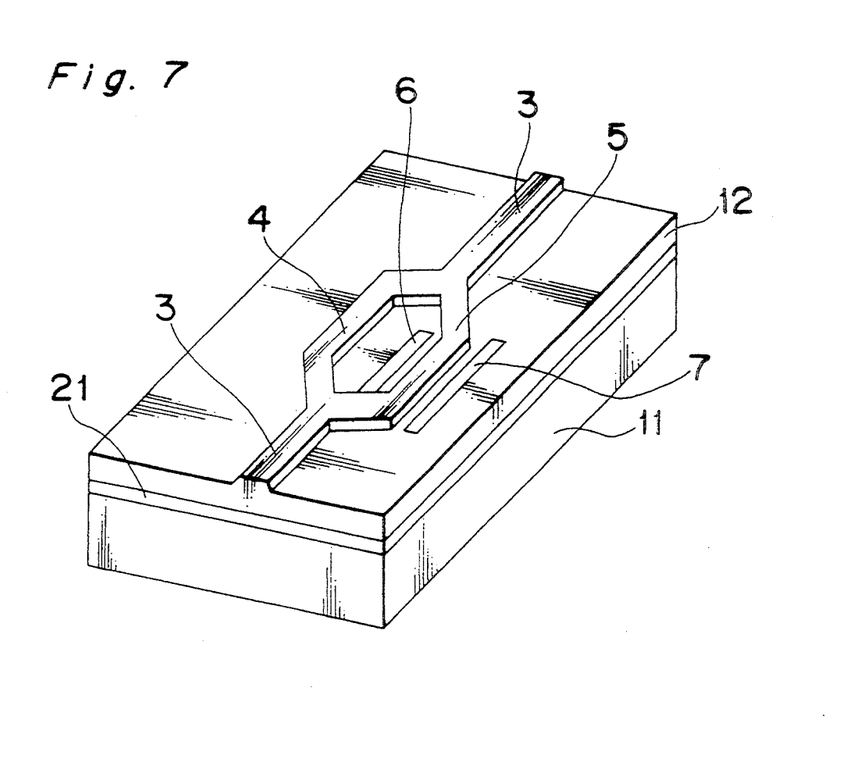
FIG. 7 is an oblique view of an optical guided-wave device according to the fourth embodiment of the invention.
Figure 8:
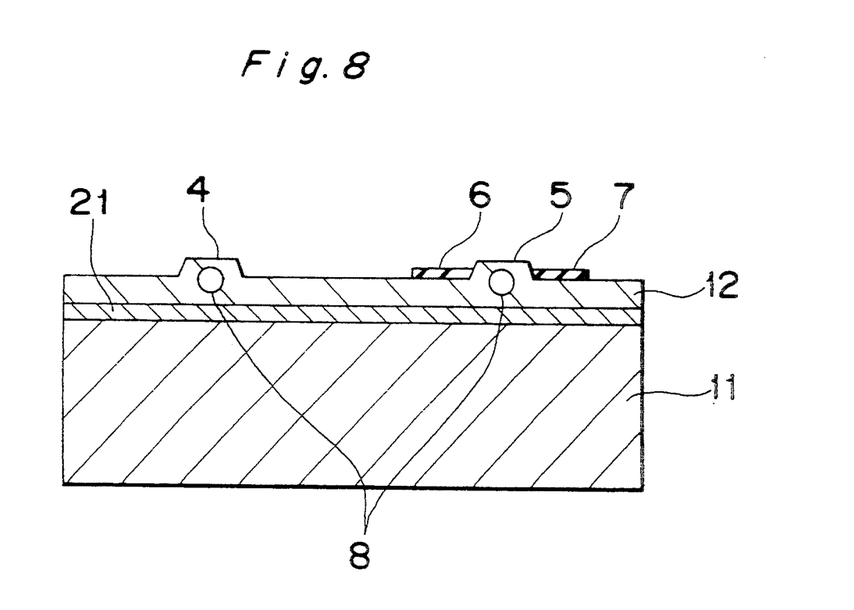
FIG. 8 is a cross section of an optical guided-wave device according to the fourth embodiment of the invention.

This sixth embodiment describes a fourth embodiment of an optical guided-wave device structure according to the present invention as shown in FIGS. 7 and 8. FIG. 7 is an oblique view of the optical guided-wave device as applied in an optical modulator, and FIG. 8 is a cross section of FIG. 7 at a section through the first and second optical wave guide branches 4 and 5. This embodiment differs from the fifth in that a lithium niobate thin-plate 12 is bonded by a glass film 21 to a lithium tantalate substrate 11. Identical parts in the third and fourth embodiments are identified by the same reference numerals 3–8 and 21.

As described in the second embodiment, the refractive indices of lithium tantalate and lithium niobate differ by an appropriate amount. Light can therefore be trapped in the lithium niobate layer with the higher refractive index, thus forming an optical wave guide. Light incident to the lithium niobate thin-plate 12 is therefore trapped inside the thin-plate. By additionally employing a ridge construction, the effective dielectric constant of the area under the ridges is greater than that of the other (thinner) areas, thus trapping light below the ridges and enabling the under-ridge area to act as an optical wave guide.

The shape of the optical wave guide in this embodiment is identical to that of the fifth embodiment, and coupling efficiency with the round optical wave guide structure of the optical fiber is extremely good.

Typical values for these dimensions are a lithium tantalate substrate 11 thickness of 600 $\mu$m with all other values the same as in the fifth embodiment above.

With this construction, optical fiber coupling loss is less than 0.3 dB as in the fifth embodiment, a significant improvement over the conventional model.

optical wave guide propagation loss of less than 0.1 dB/cm is easily obtained, again as in the fifth embodiment. The results of optical damage observations were also the same as in the fifth embodiment above.

Seventh Embodiment

This seventh embodiment describes a third embodiment of a manufacturing method for an optical guided-wave device according to the invention.

First, the surfaces of two lithium niobate wafers with different crystal orientations and each mirror polished are cleaned with an etching process. On one face of each wafer, a lead borosilicate glass film is formed to a thickness of 0.25 $\mu$m. The glass film sides of each wafer are then mated and heat is applied to bond the glass films together.

The lithium niobate wafer with the crystal orientation having the higher refractive index is then mechanically polished and etched to a thin-plate layer. After reducing the wafer to a thickness of 7 $\mu$m, an etching mask is formed on the thinned lithium niobate wafer to the pattern of the optical wave guide structure shown in the fifth embodiment using photolithography techniques, and the unmasked areas (the area not forming the optical wave guide) are removed to a depth of 3 $\mu$m by etching. The mask is Cr and the etching agent is a hydrofluoric acid etching solution. The mask is then removed, and the aluminum electrodes are formed using conventional photolithography and etching technologies.

This process yields the structure of the optical guided-wave device as shown in the fifth embodiment. The coupling characteristic, propagation loss, and optical damage characteristic of this optical guided-wave device and optical fiber are as described above with reference to the fifth embodiment.

Bonding the two wafer using glass adhesion can be simply accomplished by setting the heat treatment temperature higher than the melting point of the glass, but adhesion can also be accomplished by maintaining a lower temperature near the softening point of the glass type used. Use of this lower temperature retains a glass film thickness approximately equal to the film thickness before heat treatment. While the film thickness was reduced, to varying degrees depending upon the pressure applied, with a heat treatment temperature exceeding the glass melting point, no adverse effects caused by the reduced thickness were observed. Glass compounds with a melting point ranging from 300° C. to 800° C. were used with good characteristics obtained in all cases by setting the heat treatment temperature at an appropriate level relative to the melting point, i.e., at a temperature above the softening point of the glass.

Eight Embodiment

This eighth embodiment describes a fourth embodiment of a manufacturing method for an optical guided-wave device according to the invention.

As in the seventh embodiment above, the surfaces of a lithium niobate wafer and a lithium tantalate wafer, which are ground to a mirror finish, are cleaned with an etching process. The subsequent process is the same as in the seventh embodiment above, resulting in a glass bonded wafer of lithium tantalate and lithium niobate wafers. After reducing the thickness of the lithium niobate wafer, which has a higher refractive index, to 7 $\mu$m, the wafer is masked, etched, and aluminum electrodes are formed as described in the seventh embodiment, resulting in an optical guided-wave device constructed as described in the sixth embodiment above.

The coupling characteristic, propagation loss, and optical damage characteristic of this optical guided-wave device coupled to the optical fiber are as described above with reference to the sixth embodiment.

In both the seventh and eighth embodiments, bond strength increases, in general, as the heat treatment process temperature or time increases. When the temperature exceeds 1100° C., however, lithium is rapidly released from the surface of both lithium niobate and lithium tantalate wafers, significantly deteriorating the wafer surface characteristics and optical guided-wave device performance. The bonding heat treatment temperature is therefore preferably less than 1100° C.

Because the thermal expansion coefficients are equivalent when two lithium niobate wafers are bonded as described in the seventh embodiment, the heat treatment temperature needed to improve bond strength is both higher and easier to regulate. In this case wafer separation does not occur even when a high mechanical polishing force is used to thin the wafer, and the optical guided-wave device itself can operate stably at a higher temperature. As a result, when the optical guided-wave device is manufactured by bonding wafers of like materials, a device with a high direct bond strength and stable operation at high temperatures can be obtained.

Ninth Embodiment

Figure 9:
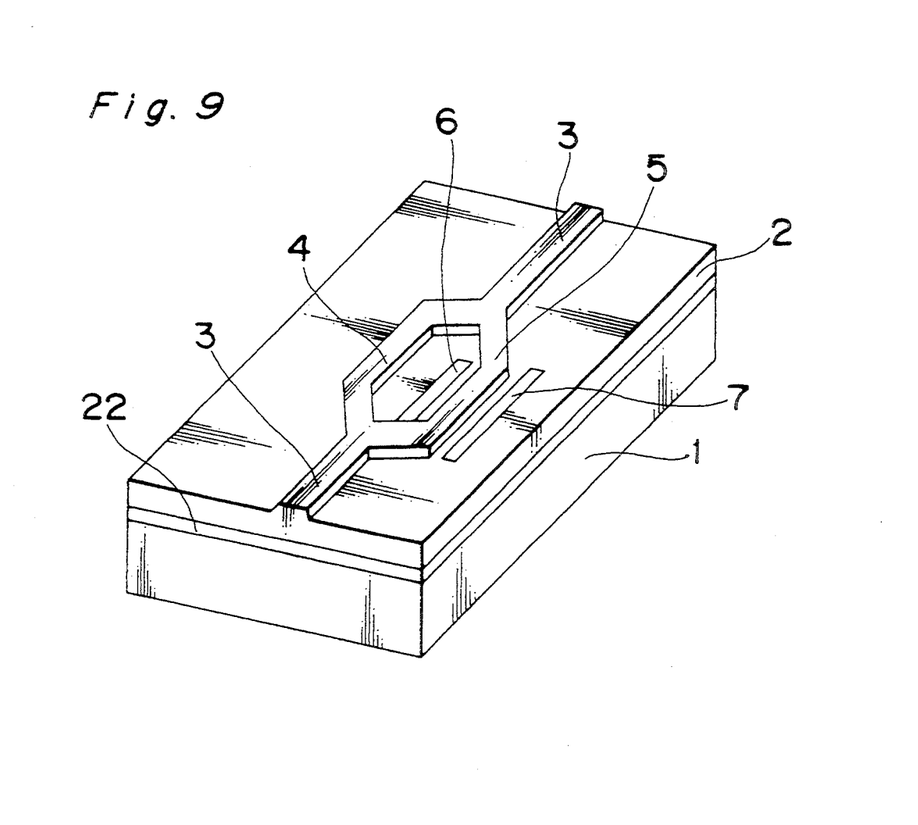
FIG. 9 is an oblique view of an optical guided-wave device according to the fifth embodiment of the invention.
Figure 10:
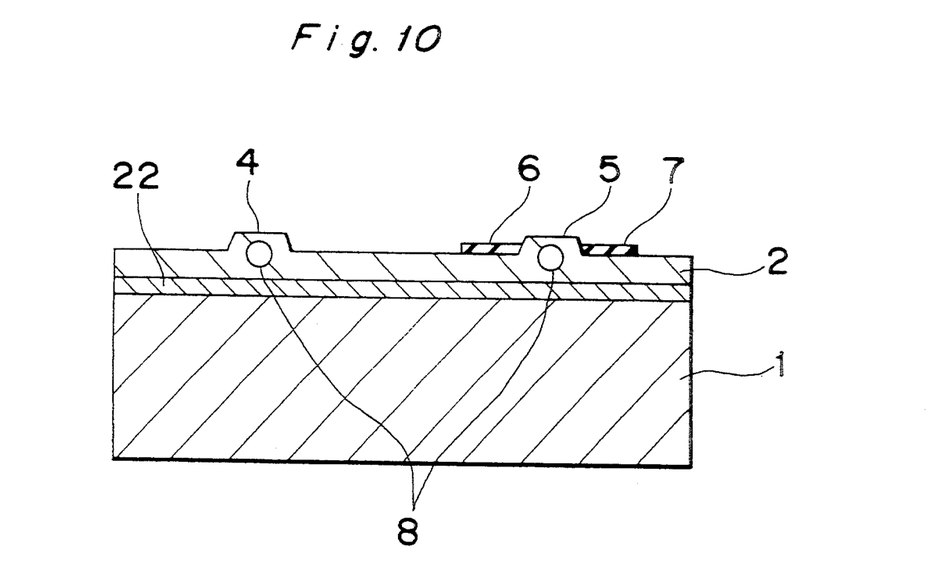
FIG. 10 is a cross section of an optical guided-wave device according to the fifth embodiment of the invention.

This ninth embodiment describes a fifth embodiment of an optical guided-wave device structure according to the present invention is described below with reference to FIGS. 9 and 10. As in the first embodiment above, FIG. 9 is an oblique view of the optical guided-wave device as applied in an optical modulator, and FIG. 10 is a cross section of FIG. 9 at a section through the first and second optical wave guide branches 4 and 5. Identical parts in the first and third embodiments are identified by the same reference numerals 1–8.

This embodiment differs from the fifth in that a silicon oxide film 22 bonds the lithium niobate substrate 1 to the lithium niobate thin-plate 2.

The optical wave guide branches 4 and 5 and the I/O optical wave guide 3 have a trapezoidal cross section characteristic of a so-called ridge-type optical wave guide. The guided light propagators 8 are located below the optical wave guide branches 4 and 5. The structure and function of the optical modulator are basically the same as described in the first embodiment.

As also described in the first embodiment, the dielectric constant of lithium niobate parallel to the optical axis of the crystal is significantly different from the dielectric constant perpendicular to the optical axis, resulting in a corresponding difference in the refractive index in each direction. In this embodiment the crystal axes of the lithium niobate substrate 1 and the lithium niobate thin-plate 2 are selected so that the refractive index of the lithium niobate thin-plate 2 is greater than that of the lithium niobate substrate 1 for the optical propagation mode. As the refractive index of the bonding silicon oxide film 22 between the wafers is approximately 1.46 and less than that of lithium niobate, light incident to the lithium niobate thin-plate 2 is trapped inside the thin-plate. By additionally employing a ridge construction in the lithium niobate thin-plate 2, the effective dielectric constant of the area under the ridges is greater than that of the other (thinner) areas, thus trapping light below the ridges and enabling the under-ridge area to act as an optical wave guide.

The shape of the optical wave guide in this case is either trapezoidal or rectangular in end cross section with a uniform refractive index, thus placing the center of the guided light near the center of the optical wave guide with an approximately circular cross section. The cross section of the I/O optical wave guide 3 is also the same. This results in extremely good coupling efficiency between the round I/O optical wave guide structure and the core (approx. 10 $\mu$m diameter) of the optical fiber.

Typical values for these dimensions are a lithium niobate substrate 1 thickness of 600 $\mu$m, lithium niobate thin-plate 2 thickness of 7 $\mu$m, peak ridge height of 3 $\mu$m, optical wave guide width of 7 $\mu$m, silicon oxide film 22 thickness of 0.5 $\mu$m, optical wave guide branch length of 2 cm, and total optical wave guide length of 3 cm. The electrodes are aluminum.

With this construction, optical fiber coupling loss is less than 0.3 dB at one plane when coupled with adhesive bonding using an adhesive with an adjusted refractive index, a significant improvement over the coupling loss in conventional devices. The performance of the optical modulator itself is equivalent to that of the conventional titanium diffusion optical wave guide.

Optical propagation loss of the optical wave guide is also significantly reduced because a lithium niobate thin-plate with the optical characteristics of pure single crystals is used without ion diffusion processing. Specifically, optical wave guide propagation loss of less than 0.1 dB/cm is easily obtained, a significant improvement over the conventional model.

The strength of the input light was also varied from 0 dBm to 30 dBm to determine the optical damage characteristic, but virtually no optical damage was observed. This is attributed to the use of a pure single crystal lithium niobate thin-plate with an extremely low level of trapped electrons as the optical wave guide.

Measurements were made using a 1.3 $\mu$m wavelength light.

Tenth Embodiment

Figure 11:
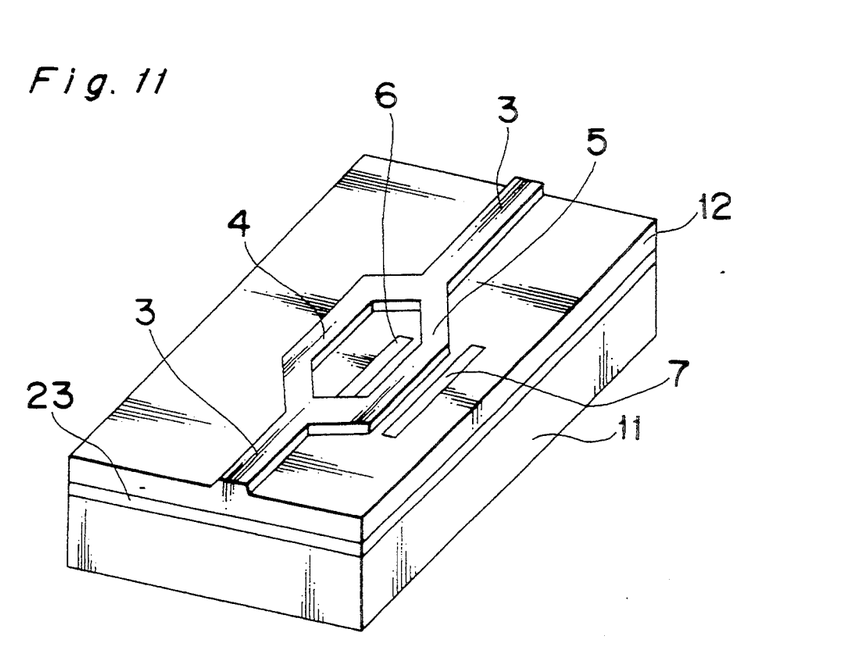
FIG. 11 is an oblique view of an optical guided-wave device according to the sixth embodiment of the invention.
Figure 12:
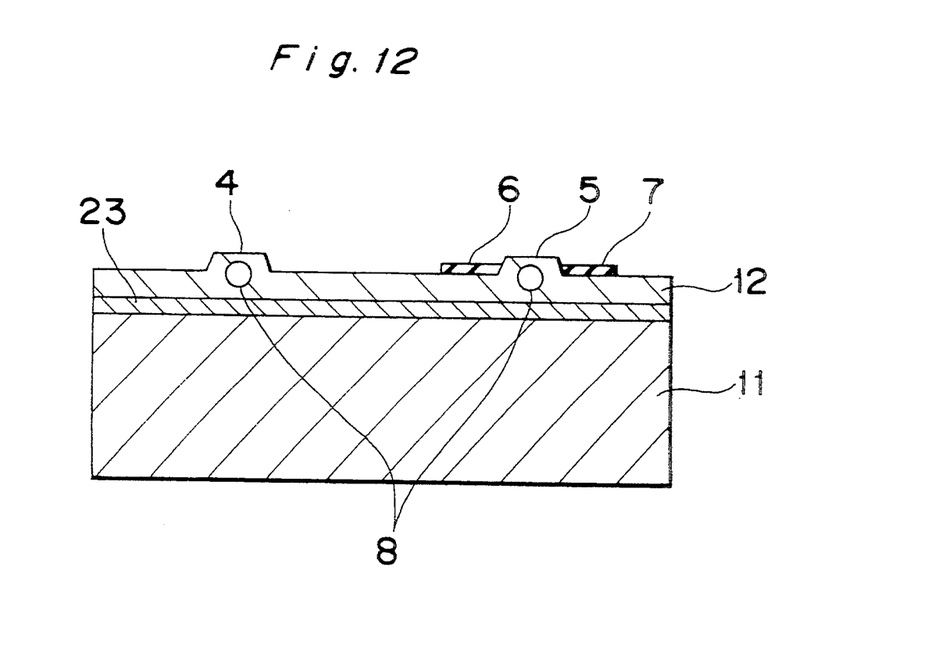
FIG. 12 is a cross section of an optical guided-wave device according to the sixth embodiment of the invention.

This tenth embodiment describes a sixth embodiment of an optical guided-wave device structure according to the present invention as shown in FIGS. 11 and 12. FIG. 11 is an oblique view of the optical guided-wave device as applied in an optical modulator, and FIG. 12 is a cross section of FIG. 11 at a section through the first and second optical wave guide branches 4 and 5. This embodiment differs from the ninth in that a lithium niobate thin-plate 12 is bonded by a silicon nitride film 23 to a lithium tantalate substrate 11. Identical parts in the first and tenth embodiments are identified by the same reference numerals 3–8.

As described in the second embodiment, the refractive indices of lithium tantalate and lithium niobate differ by an appropriate amount. Light can therefore be trapped in the lithium niobate layer with the higher refractive index, thus forming an optical wave guide. Light incident to the lithium niobate thin-plate 12 is therefore trapped inside the thin-plate. By additionally employing a ridge construction, the effective dielectric constant of the area under the ridges is greater than that of the other (thinner) areas, thus trapping light below the ridges and enabling the under-ridge area to act as an optical wave guide.

As the refractive index of the bonding silicon nitride film 23 between the wafers is approximately 1.9 and less than that of lithium niobate, light incident to the lithium niobate thin-plate 2 is trapped inside the thin-plate.

The shape of the optical wave guide in this embodiment is identical to that of the ninth embodiment, and coupling efficiency with the round optical wave guide structure of the optical fiber is extremely good.

Typical values for these dimensions are a silicon nitride film 23 thickness of 0.5 $\mu$m, and a lithium tantalate substrate 11 thickness of 600 $\mu$m with all other values the same as in the ninth embodiment above.

With this construction, optical fiber coupling loss is less than 0.3 dB as in the ninth embodiment, a significant improvement over the conventional model.

Propagation loss of less than 0.1 dB/cm is easily obtained, again as in the ninth embodiment. The results of optical damage observations were also the same as in the ninth embodiment above.

Eleventh Embodiment

Figure 13:
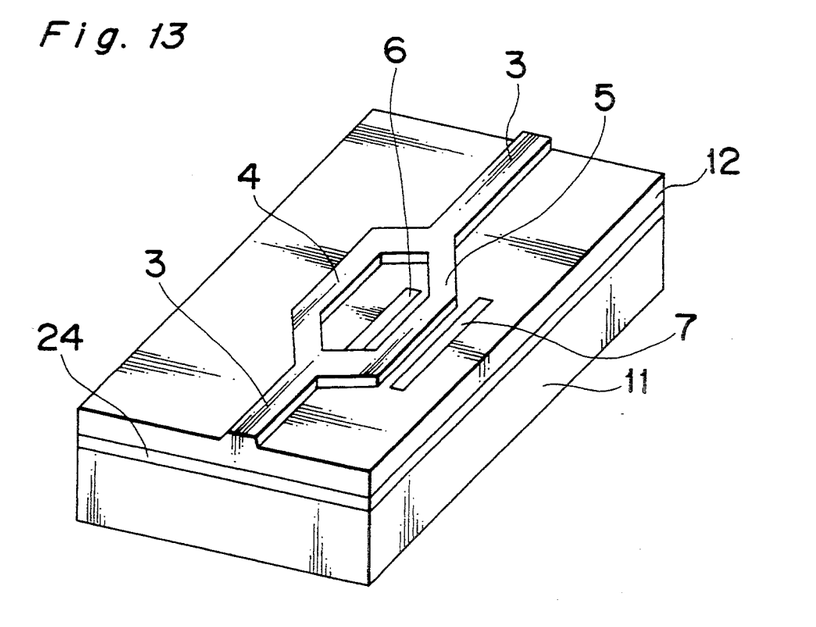
FIG. 13 is an oblique view of an optical guided-wave device according to the seventh embodiment of the invention.
Figure 14:
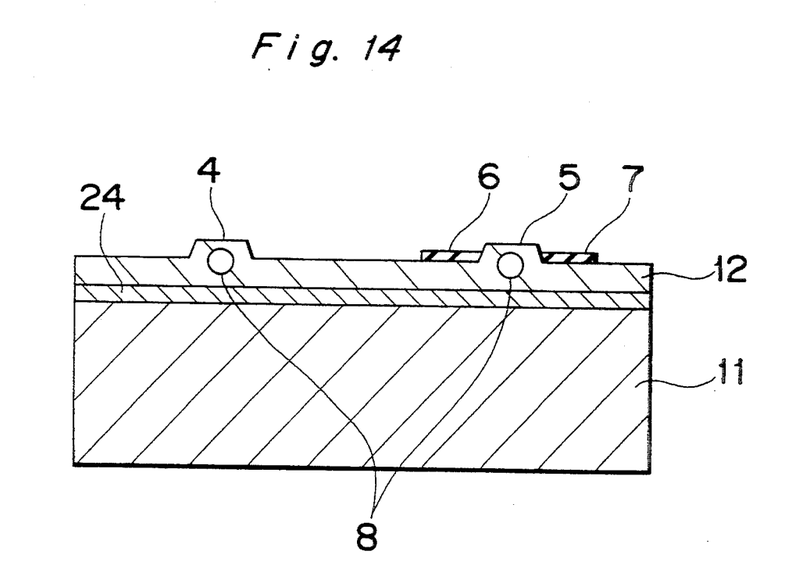
FIG. 14 is a cross section of an optical guided-wave device according to the seventh embodiment of the invention.

This eleventh embodiment describes a seventh embodiment of an optical guided-wave device structure according to the present invention as shown in FIGS. 13 and 14. FIG. 13 is an oblique view of the optical guided-wave device as applied in an optical modulator, and FIG. 14 is a cross section of FIG. 13 at a section through the first and second optical wave guide branches 4 and 5. This embodiment differs from the tenth in that a lithium niobate thin-plate 12 is bonded by a silicon film 24 to a lithium tantalate substrate 11. Identical parts in the second and eleventh embodiments are identified by the same reference numerals 3–8.

As described in the tenth embodiment, light incident to the lithium niobate thin-plate 12 is trapped inside the thin-plate because of the difference in the refractive indices of lithium tantalate and lithium niobate. By additionally employing a ridge construction, the effective dielectric constant of the area under the ridges is greater than that of the other (thinner) areas, thus trapping light below the ridges and enabling the under-ridge area to act as an optical wave guide.

As the refractive index of the silicon film is less than that of the lithium niobate film and is absorbent to light with a 1.3 μm wavelength, light incident to the lithium niobate thin-plate 2 is trapped inside the thin-plate.

The shape of the optical wave guide in this embodiment is identical to that of the ninth embodiment, and coupling efficiency with the round optical wave guide structure of the optical fiber is extremely good.

Typical values for these dimensions are a silicon film 24 thickness of 0.5 μm with all other values the same as in the ninth embodiment above. Optical fiber coupling loss is less than 0.3 dB as in the ninth embodiment, a significant improvement over the conventional model.

Optical wave guide propagation loss of less than 0.1 dB/cm is easily obtained, again as in the ninth embodiment. The results of optical damage observations were also the same as in the ninth embodiment above.

Twelfth Embodiment

This twelfth embodiment describes a fifth embodiment of a manufacturing method for an optical guided-wave device according to the invention.

First, the surfaces of two lithium niobate wafers with different crystal orientations and each mirror polished are cleaned with an etching process. A silicon oxide film is formed on one face of each wafer to a thickness of 0.25 μm using a plasma CVD method. The silicon oxide film surfaces are then cleaned with an etching process and treated with a hydrophilic process. Specifically, the silicon oxide film surface layer is etched to a very slight degree using a hydrofluoric acid etching solution, simultaneously cleaning the surface and making the surface hydrophilic. The surfaces are then flushed in demineralized water and immediately sandwiched uniformly together, easily enabling direct bonding by the water, hydroxyl groups, and hydrogen adsorbed in the silicon oxide film surface. While this process yields a sufficiently strong bond, the bond is further strengthened by heat treatment at a temperature between 100° C. and 1100° C.

The lithium niobate wafer with the crystal orientation having the higher refractive index is then mechanically polished and etched to a thin-plate layer. After reducing the wafer to a thickness of 7 μm, an etching mask is formed on the thinned lithium niobate wafer to the pattern of the optical wave guide structure shown in the ninth embodiment using photolithography techniques, and the unmasked areas (the area not forming the optical wave guide) are removed to a depth of 3 μm by etching. The mask is Cr. Etching is performed by reactive ion etching using a $CF_4$ gas. The mask is then removed, and the aluminum electrodes are formed using conventional photolithography and etching technologies.

This process yields the structure of the optical guided-wave device as shown in the ninth embodiment. The coupling characteristic, propagation loss, and optical damage characteristic of this optical guided-wave device and optical fiber are as described above with reference to the ninth embodiment.

Heat treatment of the silicon oxide film is possible in the range from 100° C. to 1100° C. with a higher heat treatment temperature yielding a higher bond strength.

Thirteenth Embodiment

This thirteenth embodiment describes another manufacturing method for an optical guided-wave device according to the invention.

As in the twelfth embodiment above, the surfaces of a lithium niobate wafer and a lithium tantalate wafer, which are ground to a mirror finish, are cleaned with an etching process. A silicon oxide film is formed on one face of each wafer to a thickness of 0.25 μm using a plasma CVD method. As in the twelfth embodiment, the silicon oxide film surfaces are then cleaned with an etching process and treated with a hydrophilic process, flushed in demineralized water, and immediately sandwiched uniformly together, thereby bonding the lithium tantalate and lithium niobate layers together by means of the silicon oxide film. Bond strength is increased by heat treatment at 100°–1100° C.

The subsequent process is the same as in the twelfth embodiment above, resulting in silicon oxide film bonding of the lithium tantalate and lithium niobate wafers. Aluminum electrodes are then formed as described in the twelfth embodiment, resulting in an optical guided-wave device constructed as described in the tenth embodiment above.

The coupling characteristic, propagation loss, and optical damage characteristic of this optical guided-wave device and optical fiber are as described above with reference to the tenth embodiment.

Heat treatment of the silicon oxide film is possible in the range from 100° C. to 1100° C. with a higher heat treatment temperature yielding a higher bond strength.

Fourteenth Embodiment

This fourteenth embodiment describes a seventh embodiment of the manufacturing method for an optical guided-wave device according to the invention.

As in the twelfth embodiment above, the surfaces of a lithium niobate wafer and a lithium tantalate wafer, which are ground to a mirror finish, are cleaned with an etching process. An amorphous silicon film is formed on one face of each wafer to a thickness of 0.25 μm using a plasma CVD method. As in the twelfth embodiment, the amorphous silicon film surfaces are then cleaned with an etching process and treated with a hydrophilic process, flushed in demineralized water, and immediately sandwiched uniformly together, thereby bonding the lithium tantalate and lithium niobate layers together by means of the amorphous silicon film. Bond strength is increased by heat treatment at 100°–1100° C.

The subsequent process is the same as in the twelfth embodiment above, resulting in amorphous silicon film bonding of the lithium tantalate and lithium niobate wafers. Aluminum electrodes are then formed as described in the twelfth embodiment, resulting in an optical guided-wave device constructed as described in the eleventh embodiment above.

The coupling characteristic, propagation loss, and optical damage characteristic of this optical guided-wave device and optical fiber are as described above with reference to the eleventh embodiment.

Heat treatment of the amorphous silicon film is possible in the range from 100° C. to 1100° C. with a higher heat treatment temperature yielding a higher bond strength. However, if the heat treatment temperature exceeds the crystallization temperature of the amorphous silicon, the amorphous silicon changes to a polycrystalline silicon film but the bond state is maintained.

In the twelfth, thirteenth, and fourteenth embodiments described above, bond strength increases, in general, as the heat treatment temperature increases. When the temperature exceeds 1100° C. however lithium is rapidly released from the surface of both lithium niobate and lithium tantalate wafers, significantly deteriorating the wafer surface characteristics and optical guided-wave device performance. The bonding heat treatment temperature is therefore preferably less than 1100° C.

Because the thermal expansion coefficients are equivalent when two lithium niobate wafers are bonded as described in the twelfth embodiment, the heat treatment temperature needed to improve bond strength is both higher and easier to regulate. In this case wafer separation does not occur even when a high mechanical polishing force is used to thin the wafer, and the optical guided-wave device itself can operate stably at a higher temperature. As a result, when the optical guided-wave device is manufactured by bonding wafers of like materials, a device with a high bond strength and stable operation at high temperatures can be obtained.

The thickness of the bonding film in these three embodiments can also be freely controlled within the range from 0.1 to 3 μm by changing the plasma CVD conditions.

Direct bonding is attributed to the ion bonding strength of the water, hydroxyl groups, and hydrogen adsorbed by the surface of the silicon oxide, silicon nitride, and amorphous silicon layers. Application of heat in this state causes the water to escape from the bonding interface and both directly adsorbed hydrogen and hydrogen in the hydroxyl groups to escape. The residual oxygen and oxygen in the surface of the dielectric (which is an oxide) to react with the other constituent elements of the dielectric, thereby increasing the bond strength.

It is to be noted that while typical dimensions are described for each of the above embodiments, the invention shall not be so limited to the stated dimensions and any ranges of values enabling formation of a good optical wave guide are within the scope of the invention.

In addition, lithium niobate and lithium tantalate are used by way of example only as single crystal dielectric bodies. It will be obvious that the principle of the invention is applicable to other dielectric bodies having an electro-optic effect and formed in a similar manner.

The preferred embodiments above describe only examples of the relationship between specific wafer types and bonding films, and various other combinations are also valid. For example, in the twelfth embodiment above, a silicon nitride film or silicon film can be substituted for the silicon oxide film, and a silicon oxide film can be used in the thirteenth embodiment while obtaining an equivalent structure and effect. When using a silicon film, the initial film state can be either amorphous or polycrystalline, and the state obtained after heat treatment and dependent upon the heat treatment temperature can be either amorphous or polycrystalline.

It is also to be noted that while the above embodiments are described as applied by way of example in a Mach-Zehnder type optical modulator, the structure of the optical modulator shall not be so limited and the principle of the invention is equally applicable to other structures using an optical wave guide. It is also obvious that the optical modulator can used as an optical switch if the guided light is modulated by the structure of the optical modulator in a switching manner. The present invention also applies to optical guided-wave devices which control the guided light using an electro-optic effect by applying a voltage to the optical wave guide. Examples of such devices include plane of polarization control devices, optical phase matching devices and optical propagation mode control devices.

The structure shown in the first embodiment is effective as a mode splitter for splitting light by controlling the propagation mode of the propagated light because the refractive indexes to ordinary and extraordinary light of the optical wave guide and the substrate differ.

[Effect of the Invention]

The following effects are achieved by means of the structure and method of the invention as described above.

With specific regard to the optical wave guide, the symmetry of the shape of the optical wave guide in cross section is good, and the center of light propagation is positioned at approximately the center of the thin-plate because of the uniform thickness of the device layers, and the layer thickness can be freely controlled. Coupling loss with the optical fiber is therefore greatly reduced.

Because there is also a great degree of freedom in the selection of materials used for the optical wave guide, and it is therefore possible to use pure single crystal dielectric wafers which have not been subject to diffusion processing, an optical guided-wave device with low optical propagation loss and minimal optical damage can be obtained.

Wafer processing is also simpler and a device with stable characteristics to high temperature levels can be obtained when the bonded wafers are of like materials because the equivalent thermal expansion coefficients of the materials make it easier to use a high temperature in the heat treatment used to improve the bond strength.

Finally, while the preferred embodiments are described as applied in an optical modulator, the essential feature of the invention is the structure of the optical wave guide itself. As a result, the invention can be generally applied in a wide range of optical guided-wave devices using an optical wave guide, and the invention can be also applied in optical switches, plane of polarization controllers, propagation mode controllers, and other optical guided-wave devices other than optical modulators.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical guided-wave device with an electro-optic effect comprising:
   a first substrate made of a first monocrystalline material with an electro-optic effect having a first refractive index, said first substrate having opposite first and second surfaces;
   a second substrate made of a second monocrystalline material with an electro-optic effect having a second refractive index larger than said first refractive index, said second substrate having opposite first and second surfaces;

said first surface of said first substrate being directly bonded onto said first surface of said second substrate with coupling of hydrogen or hydroxyl group; and at least one optical waveguide confined in said second substrate due to the difference of the refractive indices of said substrates.

2. An optical guided-wave device in accordance with claim 1, wherein said first and second substrates are made of different materials and have refractive indices different from each other due to different materials.

3. An optical guided-wave device in accordance with claim 1, wherein said first substrate is made of lithium tantalate and said second substrate is made of lithium niobate.

4. An optical guided-wave device in accordance with claim 1, wherein said guided-wave device is one device selected from a group of optical modulators, optical switches, polarization control devices, optical phase matching devices, and propagation mode control devices.

5. An optical guided-wave device in accordance with claim 1, wherein said first and second substrates are made of same material and said first and second substrates have refractive indices different from each other due to different crystalline orientations.

6. An optical guided-wave device in accordance with claim 5, wherein said first and second substrates are made of lithium niobate or lithium tantalate.

7. An optical guided-wave device with an electro-optic effect comprising:

a first substrate made of a first monocrystalline material with an electro-optic effect having a first refractive index, said first substrate having opposite first and second surfaces;

a second substrate made of a second monocrystalline material with an electro-optic effect having a second refractive index larger than said first refractive index, said second substrate having opposite first and second surfaces;

said first surface of said first substrate being directly bonded onto said first surface of said second substrate with coupling of oxygen and component atoms of said first and second substrates; and at least one optical waveguide confined in said second substrate due to the difference of the refractive indices of said substrates.

8. An optical guided-wave device in accordance with claim 7, wherein said first and second substrates are made of different materials and have refractive indices different from each other due to different materials.

9. An optical guided-wave device in accordance with claim 8, wherein said first substrate is made of lithium tantalate and said second substrate is made of lithium niobate.

10. An optical guided-wave device in accordance with claim 7, wherein said first and second substrates are made of same material and said first and second substrates have refractive indices different from each other due to different crystalline orientations.

11. An optical guided-wave device in accordance with claim 10, wherein said first and second substrates are made of lithium niobate or lithium tantalate.

12. A manufacturing method for an optical guided-wave device with an electro optic effect comprising steps of forming first and second single crystal dielectric substrates having first and second refractive indices, respectively, said second refractive index being larger than said first one, smoothing and cleaning the surfaces of said first and second substrates, applying pure water to the surfaces of said first and second substrates after subjecting the same to a hydrophilic processing, piling the surfaces of said first and second substrates with each other to bond them by means of molecules of water directly, subjecting said first and second substrates directly bonded to a heat treatment at a temperature ranging from 100° C. to 1100° C., thinning and working said second substrate to form a wave guide wherein the light to be propagated is trapped substantially.

13. The manufacturing method for an optical guided-wave according to claim 12 wherein said first and second substrates are made of same single crystal dielectric material and have different crystal orientations resulting in different refractive indices.

14. The manufacturing method for an optical guided-wave according to claim 12 or 13 wherein said first and second substrate are made of lithium tantalate.

15. The manufacturing method for an optical guided-wave according to claim 12 or 13 wherein said first and second substrate are made of lithium niobate.

16. A manufacturing method for an optical guided-wave device with an electro optic effect comprising steps of forming first and second single crystal dielectric substrates having first and second refractive indices, respectively, said second refractive index being larger than said first one, smoothing and cleaning the surfaces of said first and second substrates, forming a thin film on at least one of the surfaces of said first and second substrates, said thin film being made of one selected from a group consisting of silicon, silicon oxide and silicon nitride, applying pure water to the surfaces of said first and second substrates after subjecting the same to a hydrophilic processing, piling the surfaces of said first and second substrates via said thin film with each other to bond them by means of molecules of water direct and subjecting them to a heat treatment at a temperature ranging from 100° C. to 1100° C. to bond said first and second substrates, thinning and working said second substrate to form a wave guide wherein the light to be propagated is trapped substantially.

17. The manufacturing method for an optical guided-wave according to claim 16 wherein said first and second substrates are made of same single crystal dielectric material and have different crystal orientations resulting in different refractive indices.

18. The manufacturing method according to claim 17 wherein said same single crystal dielectric material is lithium tantalate.

19. The manufacturing method according to claim 17 wherein said same single crystal dielectric material is lithium niobate.

20. The manufacturing method for an optical guided-wave device according to claim 16 wherein said first substrate is made of lithium tantalate and said second substrate is made of lithium niobate.

21. The manufacturing method for an optical guided-wave device according to claim 16 wherein said thin film is made of amorphous silicon.

22. The manufacturing method for an optical guided-wave device according to claim 16 wherein said thin film is made of polycrystalline silicon.

23. A manufacturing method for an optical guided-wave device with an electro optic effect comprising steps of forming first and second single crystal dielectric substrates having first and second refractive indices, respectively, said second refractive index being larger than said first one, smoothing and cleaning the surfaces of said first and second substrates, forming a glass film on at least one of the surfaces of said first and second substrates, piling the surfaces of said first and second substrates via said glass film and subjecting them to a heat treatment at a temperature ranging from 100° C. to 1100° C. to bond said first and second substrates, thinning and working said second substrate to form a wave guide wherein the light to be propagated is trapped substantially.

24. The manufacturing method for an optical guided-wave device according to claim 23 wherein said glass film is low melting point glass.

25. The manufacturing method for an optical guided-wave according to claim 23 wherein said first and second substrates are made of same single crystal dielectric material and have different crystal orientations resulting in different refractive indices.

26. The manufacturing method according to claim 23 wherein said same single crystal dielectric material is lithium tantalate.

27. The manufacturing method according to claim 23 wherein said same single crystal dielectric material is lithium niobate.

28. The manufacturing method for an optical guided-wave device according to claim 23 wherein said first substrate is made of lithium tantalate and said second substrate is made of lithium niobate.

29. The manufacturing method for an optical guided-wave device according to claim 23 wherein the thickness of said thin film is less than the cut-off wave length of the propagated light.

30. An optical guided-wave device with an electro-optic effect comprising:

a first substrate made of a first monocrystalline material with an electro-optic effect having a first refractive index, said first substrate having opposite first and second surfaces;

a second substrate made of a second monocrystalline material with an electro-optic effect having a second refractive index larger than said first refractive index, said second substrate having opposite first and second surfaces;

one of said first surfaces having a non-monocrystalline thin film including silicon;

the other said first surface being directly bonded onto opposite surface of said thin film on said first surface of said substrate with coupling of hydrogen or hydroxyl group; and at least one optical waveguide confined in said second substrate due to the difference of the refractive indices of said substrates.

31. An optical guided-wave device in accordance with claim 30, wherein said first and second substrates are made of different materials and have refractive indices different from each other due to different materials.

32. An optical guided-wave device in accordance with claim 31, wherein said first substrate is made of lithium tantalate and said second substrate is made of lithium niobate.

33. An optical guided-wave device in accordance with claim 30, wherein said first and second substrates are made of same material and said first and second substrates have refractive indices different from each other due to different crystalline orientations.

34. An optical guided-wave device in accordance with claim 33, wherein said first and second substrates are made of lithium niobate or lithium tantalate.

35. An optical guided-wave device in accordance with claim 30, wherein said thin film is made of one material selected from a group of consisting of silicon oxide, silicon nitride, and glass.

36. An optical guided-wave device in accordance with claim 30, wherein said thin film is made of silicon having the thickness less than the cut-off wavelength of the propagated light.

37. An optical guided-wave device with an electro-optic effect comprising:

a first substrate made of a first monocrystalline material with an electro-optic effect having a first refractive index, said first substrate having opposite first and second surfaces;

a second substrate made of a second monocrystalline material with an electro-optic effect having a second refractive index larger than said first refractive index, said second substrate having opposite first and second surfaces;

one of said first surfaces having a non-monocrystalline thin film including silicon;

the other said first surface being directly bonded onto opposite surface of said non-monocrystalline thin film on said first surface of said substrate with coupling of oxygen and component atoms of said first and second substrates; and at least one optical waveguide confined in said second substrate due to the difference of the refractive indices of said substrates.

38. An optical guided-wave device in accordance with claim 37, wherein said first and second substrates are made of different materials and have refractive indices different from each other due to different materials.

39. An optical guided-wave device in accordance with claim 38, wherein said first substrate is made of lithium tantalate and said second substrate is made of lithium niobate.

40. An optical guided-wave device in accordance with claim 37, wherein said first and second substrates are made of same material and said first and second substrates have refractive indices different from each other due to different crystalline orientations.

41. An optical guided-wave device in accordance with claim 40, wherein said first and second substrates are made of lithium niobate or lithium tantalate.

42. An optical guided-wave device in accordance with claim 37, wherein said thin film is made of one material selected from a group of consisting of silicon oxide, silicon nitride, and glass.

43. An optical guided-wave device in accordance with claim 37, wherein said thin film is made of silicon having the thickness less than the cut-off wavelength of the propagated light.

* * * * *